United States Patent
Muruganathan et al.

(10) Patent No.: US 12,348,317 B2
(45) Date of Patent: Jul. 1, 2025

(54) SYSTEMS AND METHODS FOR RELIABLE MAC CE ACK/NACK CONFIRMATION

(71) Applicant: Telefonaktiebolaget LM Ericsson (publ), Stockholm (SE)

(72) Inventors: Siva Muruganathan, Stittsville (CA); Xingqin Lin, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 427 days.

(21) Appl. No.: 17/768,535

(22) PCT Filed: Oct. 14, 2020

(86) PCT No.: PCT/IB2020/059667
§ 371 (c)(1),
(2) Date: Apr. 13, 2022

(87) PCT Pub. No.: WO2021/074827
PCT Pub. Date: Apr. 22, 2021

(65) Prior Publication Data
US 2023/0275705 A1  Aug. 31, 2023

Related U.S. Application Data

(60) Provisional application No. 62/915,423, filed on Oct. 15, 2019.

(51) Int. Cl.
*H04L 1/1829* (2023.01)

(52) U.S. Cl.
CPC .......... *H04L 1/1861* (2013.01); *H04L 1/1864* (2013.01)

(58) Field of Classification Search
CPC .............. H04L 1/1861; H04L 1/1864; H04L 1/1822; H04L 1/1812; H04L 5/0055; H04B 7/1851; H04W 28/04
See application file for complete search history.

(56) References Cited

U.S. PATENT DOCUMENTS 10,863,494 B2    12/2020  Zhang et al.
11,621,803 B2 *   4/2023  Wen .................. H04L 1/1822
                                            370/329
(Continued)

FOREIGN PATENT DOCUMENTS

CN    109803427 A  *  5/2019  ........... H04B 17/373
EP      3684119 A1     7/2020

OTHER PUBLICATIONS

Sony: "Discussion on delay-tolerant HARQ for NTN", 3GPP Draft; R1-1910748; 650, Route Des Lucioles ; F-06921 Sophia-Antipolis Cedex ; France vol. RAN WG1, no. Chongqing, China; Oct. 14, 2019-Oct. 20, 2019 Oct. 4, 2019 (Oct. 4, 2019), (Year: 2019).*

(Continued)

*Primary Examiner* — Mohammad S Adhami
*Assistant Examiner* — Samuel Dilan Rutnam
(74) *Attorney, Agent, or Firm* — Withrow & Terranova, PLLC

(57) ABSTRACT

Systems and methods for reliable Medium Access Control (MAC) Control Element (CE) ACK/NACK confirmation are provided. In some embodiments, a method performed by a wireless device includes: being configured with at least one feedback enabled Hybrid Automatic Repeat Request (HARQ) process while the remaining HARQ processes of the wireless device have feedback disabled; receiving an activation/deactivation command requiring feedback, where the receiving uses the at least one feedback enabled HARQ process; and/or transmitting feedback regarding the activation/deactivation command. In this way, the wireless device is enabled to send HARQ ACK/NACK feedback related to critical activation/deactivation MAC CE commands in a Non-Terrestrial Network (NTN). Furthermore, in the presence of large one way delay, this ensures that there is no mismatch between the base station and the wireless device as to when the wireless device can assume the activation/

(Continued)

deactivation information in the MAC CE command can takes effect at the wireless device.

12 Claims, 11 Drawing Sheets

(56) References Cited

U.S. PATENT DOCUMENTS

| | | | |
|---|---|---|---|
| 2017/0295601 | A1 | 10/2017 | Kim et al. |
| 2019/0306924 | A1 | 10/2019 | Zhang et al. |
| 2019/0312698 | A1 | 10/2019 | Akkarakaran et al. |

OTHER PUBLICATIONS

Asia Pacific Telecom: "Discussion on delay-tolerant re-transmission mechanisms for NTN", 3GPP Draft; R1-1910844; 650, Route Des Lucioles ; F-06921 Sophia-A vol. RAN WG1, no. Chongqing, China; Oct. 14, 2019-Oct. 20, 2019 Oct. 5, 2019 (Oct. 5, 2019) (Year: 2019).*

Ericsson, "R1-1809406: Maintenance issues of physical uplink control channel," 3GPP TSG-RAN WG1 Meeting #94, Aug. 20-24, 2018, Gothenburg, Sweden, 18 pages.

Huawei, et al., "R4-1901808: Discussion on the HARQ timing for NR UE demodulation performance requirements," 3GPP TSG-RAN WG4 Meeting #90, Feb. 25-Mar. 1, 2019, Athens, Greece, 8 pages.

Mediatek Inc., "R4-1910918: Discussion on NR fast Scell activiation," 3GPP TSG-RAN WG4 Meetig #92Bis, Oct. 14-18, 2019, Chongqing, China, 14 pages.

Qualcomm Incorporated, "R1-1911099: Enhancements to Scheduling and HARQ operation for NR-U," 3GPP TSG RAN WG1 Meeting #98bis, Oct. 14-20, 2019, Chongqing, China, 17 pages.

Decision to Grant for Japanese Patent Application No. 2022-521588, mailed Apr. 25, 2023, 5 pages.

Author Unknown, "Technical Specification Group Radio Access Network; Study on New Radio (NR) to support non-terrestrial networks (Release 15)," Technical Report 38.811, Version 15.1.0, Jun. 2019, 3GPP Organizational Partners, 126 pages.

Asia Pacific Telecom, "R1-1910844: Discussion on delay-tolerant re-transmission mechanisms for NTN," 3GPP TSG-RAN WG1 Meeting #98-Bis, Oct. 14-20, 2019, Chongqing, China, 2 pages.

Mediatek Inc., "R1-1909783: Summary of 7.2.5.4 on more delay-tolerant re-transmission mechanisms in NR-NTN," 3GPP TSG RAN WG1 Meeting #98, Aug. 26-30, 2019, Prague, Czech Republic, 10 pages.

Sony, "R1-1910748: Discussion on delay-tolerant HARQ for NTN," 3GPP TSG RAN WG1 Meeting #98bis, Oct. 14-20, 2019, Chongqing, China, 6 pages.

Thales, "RP-181370: Study on solutions evaluation for NR to support Non Terrestrial Network," 3GPP TSG RAN meeting #80, Jun. 11-14, 2018, La Jolla, California, 5 pages.

International Search Report and Written Opinion for International Patent Application No. PCT/IB2020/059667, mailed Jan. 25, 2021, 18 pages.

Office Action for Colombian Patent Application No. NC2022/0006062, mailed Oct. 30, 2024, 30 pages.

* cited by examiner

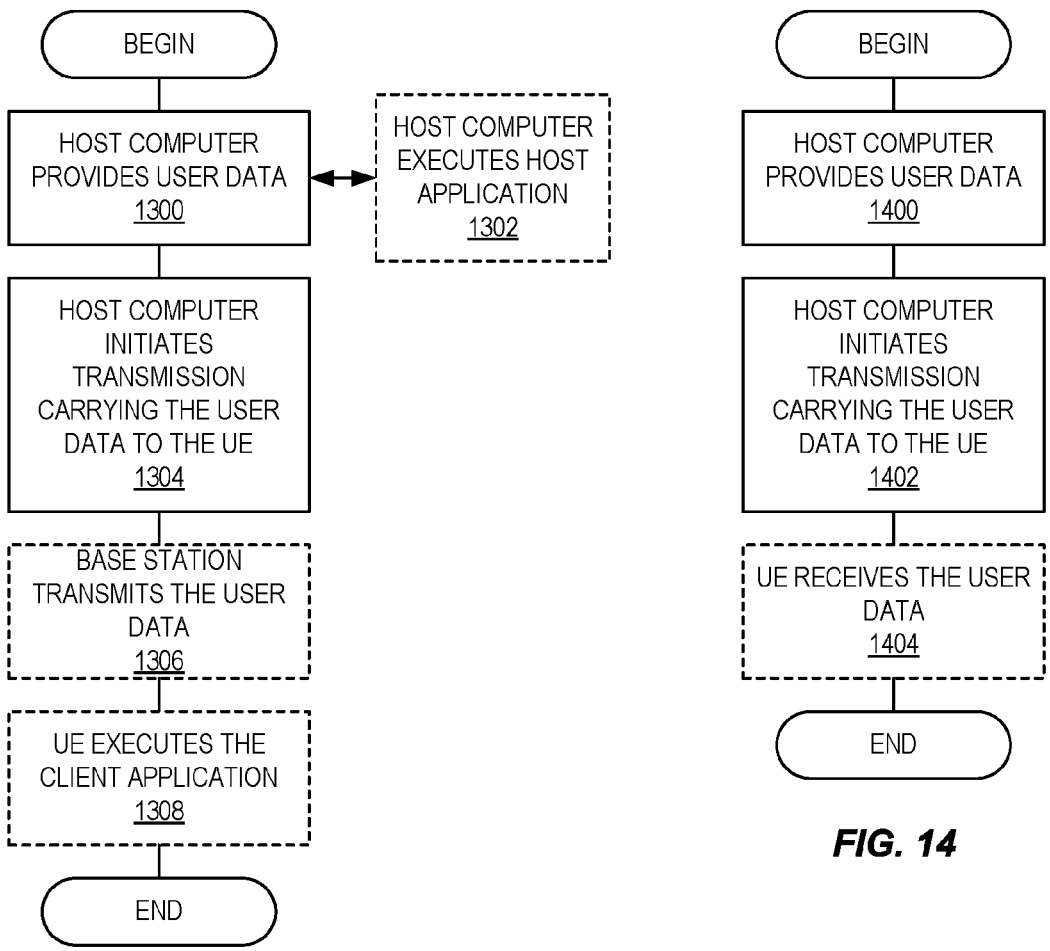

SYSTEMS AND METHODS FOR RELIABLE MAC CE ACK/NACK CONFIRMATION

RELATED APPLICATIONS

This application is a 35 U.S.C. § 371 national phase filing of International Application No. PCT/IB2020/059667, filed Oct. 14, 2020, which claims the benefit of provisional patent application Ser. No. 62/915,423, filed Oct. 15, 2019, the disclosures of which are hereby incorporated herein by reference in their entireties.

TECHNICAL FIELD

The current disclosure relates to transmitting feedback.

BACKGROUND

In Third Generation Partnership Project (3GPP) Release 15, the first release of the 5G system (5GS) was developed. This is a new generation's radio access technology intended to serve use cases such as enhanced mobile broadband (eMBB), ultra-reliable and low latency communication (URLLC) and Massive Machine Type Communication (mMTC). 5G includes the New Radio (NR) access stratum interface and the 5G Core Network (5GC). The NR physical and higher layers are reusing parts of the Long Term Evolution (LTE) specification, and to that adding needed components when motivated by the new use cases.

In Release 15, 3GPP started the work to prepare NR for operation in a Non-Terrestrial Network (NTN). The work was performed within the study item "NR to support Non-Terrestrial Networks" and resulted in TR 38.811 [1]. In Release 16, the work to prepare NR for operation in an NTN network continues with the study item "Solutions for NR to support Non-Terrestrial Network" [2].

A satellite radio access network usually includes the following components:
  A satellite that refers to a space-borne platform.
  An earth-based gateway that connects the satellite to a base station or a core network, depending on the choice of architecture.
  Feeder link that refers to the link between a gateway and a satellite.
  Service link that refers to the link between a satellite and a User Equipment (UE).

Two popular architectures are the Bent pipe transponder and the Regenerative transponder architectures. In the first case, the base station is located on earth behind the gateway, and the satellite operates as a repeater forwarding the feeder link signal to the service link, and vice versa. In the second case, the satellite carries the base station, and the service link connects it to the earth-based core network.

Depending on the orbit altitude, a satellite may be categorized as low earth orbit (LEO), medium earth orbit (MEO), or geostationary earth orbit (GEO) satellite.
  LEO: typical heights ranging from 250-1,500 km, with orbital periods ranging from 90-120 minutes.
  MEO: typical heights ranging from 5,000-25,000 km, with orbital periods ranging from 3-15 hours.
  GEO: height at about 35,786 km, with an orbital period of 24 hours.

A communication satellite typically generates several beams over a given area. The footprint of a beam is usually in an elliptic shape, which has been traditionally referred to as a cell. The footprint of a beam is also often referred to as a spotbeam. The spotbeam may move over the earth's surface with the satellite movement or may be earth-fixed with some beam pointing mechanism used by the satellite to compensate for its motion. The size of a spotbeam depends on the system design, which may range from tens of kilometers to a few thousands of kilometers.

Hybrid automatic repeat request (HARQ) protocol is one of the most important features in NR. Together with link adaptation through channel state information (CSI) feedback and HARQ ACK/NACK, HARQ enables efficient, reliable and low delay data transmission in NR.

Existing HARQ procedures at the PHY/Medium Access Control (MAC) layer have been designed for terrestrial networks where the Round Trip Time (RTT) propagation delay is usually restricted to within 1 ms. With HARQ protocol, a transmitter needs to wait for the feedback from the receiver before sending new data. In case of a negative acknowledgement (NACK), the transmitter may need to resend the data packet. Otherwise, it may send new data. This stop-and-wait (SAW) procedure introduces inherent latency to the communication protocol, which may reduce the link throughput. To alleviate this issue, existing HARQ procedure allows activating multiple HARQ processes at the transmitter. That is, the transmitter may initiate multiple transmissions in parallel without having to wait for a HARQ completion. For example, with 16 HARQ processes in NR Downlink (DL), a New Radio Base Station (gNB) may initiate up to 16 new data transmissions without waiting for an ACK for the first packet transmission. Note that there is generally a sufficient number of HARQ processes for terrestrial networks where the propagation delay is typically less than 1 ms.

FIG. 1 shows the various delays associated with the HARQ procedure:
  1. The packet first reaches the receiver after a propagation delay Tp.
  2. The receiver sends the feedback after a processing/slot delay T1.
  3. The feedback reaches the data transmitter after a propagation delay Tp.
  4. The transmitter may send a retransmission or new data after a processing/slot delay T2.
  5. To avoid HARQ stalling, the minimum required number of HARQ processes is ceil((2Tp+T1+T2)/Ts) where Ts refers to the slot duration in NR.

Existing HARQ procedures in NR have largely been designed for terrestrial networks where the propagation delay is typically limited to 1 ms. The main issues with existing HARQ protocols amid large propagation delays are now discussed.

The existing HARQ mechanism may not be feasible when the propagation delay is much larger than that supported by the allowed number of HARQ processes. For example, consider the scenario where NR DL is to be adopted for satellite communications. For the GEO case, the RTT propagation delay can be around 500 ms. Rel-15 NR supports a maximum of 16 HARQ processes in Uplink (UL)/DL. With 16 HARQ processes supported in NR and with 1 ms slot duration, the available peak throughput as a percentage of the total channel capacity is very low. Table 1 summarizes the available peak throughput for a UE for LEO, MEO and GEO satellites. Therefore, without a sufficient number of HARQ processes, the sheer magnitude of the propagation delay may render closed-loop HARQ communication impractical.

The number of HARQ processes supported by the existing HARQ protocol is not sufficient to absorb the potentially large propagation delays in non-terrestrial networks. For example, Table 1 shows that a substantial increase in the existing number of HARQ processes is required for operating HARQ amid large propagation delays. It may be challenging to support that many HARQ processes (especially at the UE) due to one or more of the following reasons:
 a. It requires large memory at both the transmitter and receiver.
 b. It may require reducing the HARQ buffer size (and thus the maximum supported Transport Block Size (TBS)).
 c. A large number of HARQ buffers might require a large number of HARQ receivers.
 d. It may increase the signaling overhead for HARQ ID. In NR, the HARQ process ID is indicated in the Downlink Control Indicator (DCI), and currently there are 4 bits in the HARQ process number field to indicate this. Increasing the number of HARQ processes to 500 would require around 9 bits (more than double the current 4 bits in the HARQ process number field).

TABLE 1

Required number of HARQ processes in satellite networks. The peak throughput with 16 HARQ processes and Ts = 1 ms is also listed.

| Satellite | Total delay | Reqd. # HARQ processes | Available peak throughput (% of peak capacity) |
|---|---|---|---|
| LEO | ~50 ms | ~50 | ~32% |
| MEO | ~180 ms | ~180 | ~8.9% |
| GEO | ~600 ms | ~600 | ~2.7% |

In short, the existing (PHY/MAC) HARQ mechanism is ill-suited to non-terrestrial networks with large propagation delays. Moreover, there is no existing signaling mechanism for disabling HARQ at the PHY/MAC layers.

In order to adapt HARQ to non-terrestrial networks, one solution is to semi-statically enable/disable HARQ feedback. To this end, the following agreements were made in RAN2 #107:
Agreements
 It should be possible to enable/disable HARQ feedback semi-statically by RRC signaling.
 The enabling/disabling of HARQ feedback should be configurable on a per UE and per HARQ process basis
 According to the above agreement, there is no feedback for transmission if HARQ is disabled.

In NR Rel-15, several procedures rely heavily on HARQ acknowledgement to ensure reliability. There are MAC CE activation/deactivation commands that are used for activating/deactivating the following aspects. While these are used as examples, the current disclosure is not limited thereto:

Activation/deactivation of a secondary cell (sCell): When a UE receives a Physical Downlink Shared Channel (PDSCH) with an activation MAC CE command for an sCell ending in slot n, the UE assumes that the sCell is activated no earlier than slot n+k. The value of k is given as $k_1+3N_{slot}^{subframe,\mu}+1$ where $k_1$ is a number of slots for a Physical Uplink Control Channel (PUCCH) transmission with HARQ-ACK information for the PDSCH reception and is indicated by the PDSCH-to-HARQ_feedback timing indicator field in the DCI format scheduling the PDSCH. Further, $N_{slot}^{subframe,\mu}$ is the number of slots per subframe for the subcarrier spacing configuration (SCS) μ of the PUCCH transmission. Similarly, if the UE receives a deactivation MAC CE command for an sCell ending in slot n, the UE assumes that the sCell is deactivated from slot n+k.

Activation of spatial relation information for PUCCH: If the UE is configured with more than one spatial relation information for a PUCCH, then the UE can receive a PDSCH with an activation MAC CE command for one of the spatial relation information. The UE applies the spatial relation information indicated in the activation MAC CE command in the first slot after slot $k+3N_{slot}^{subframe,\mu}$ where k is the slot where the UE would transmit a PUCCH with ACK-NACK information for the PDSCH providing the activation command.

Activation/deactivation of Transmission Configuration Indicator (TCI) state information for CORESET: If the UE is configured with more than one TCI state for a CORESET, then the UE can receive a PDSCH with an activation MAC CE command for one of the TCI states configured to the CORESET. The UE applies the TCI State indicated in the activation MAC CE command in the first slot after slot $k+3N_{slot}^{subframe,\mu}$ where k is the slot where the UE would transmit a PUCCH with ACK-NACK information for the PDSCH providing the activation command.

Activation/deactivation of ZP (zero-power) CSI-RS (channel state information reference signal) resource sets: If the UE is configured with a list of semi-persistent ZP-CSI-RS-ResourceSet(s), then the UE can receive a PDSCH with an activation MAC CE command for semi-persistent ZP CSI-RSs. The UE assumes the semi-persistent ZP-CSI-RS resource(s) indicated in the activation MAC CE command are activated starting from the first slot after slot $n+3N_{slot}^{subframe,\mu}$ where n is the slot where the UE would transmit a PUCCH with ACK-NACK information for the PDSCH providing the activation command. Similarly, the UE can receive a PDSCH with a deactivation MAC CE command for semi-persistent ZP CSI-RSs. The UE assumes the semi-persistent ZP-CSI-RS resource(s) indicated in the deactivation MAC CE command are deactivated starting from the first slot after slot $n+3N_{slot}^{subframe,\mu}$ where n is the slot where the UE would transmit a PUCCH with ACK-NACK information for the PDSCH providing the deactivation command.

Activation/deactivation of TCI (Transmission Configuration Indicator) state information for PDSCH: If the UE is configured with more than one TCI state for a PDSCH, then the UE can receive a PDSCH with an activation MAC CE command for one or more of the TCI states configured to the PDSCH that would be mapped to the codepoints of the TCI field of the DCI. The UE applies the mapping of the one or more TCI States to the codepoints of the TCI field of the DCI indicated in the activation MAC CE command in the first slot after slot $n+3N_{slot}^{subframe,\mu}$ where n is the slot where the UE would transmit a PUCCH with ACK-NACK information for the PDSCH providing the activation command.

Activation/deactivation of semi-persistent CSI resource settings: the UE can receive a PDSCH with an activation MAC CE command for semi-persistent CSI resource settings. The UE assumes the semi-persistent CSI resource setting(s) indicated in the activation MAC CE command are activated starting from the first slot after slot $n+3N_{slot}^{subframe,\mu}$ where n is the slot where the UE would transmit a PUCCH with ACK-NACK information for the PDSCH providing the activation command. Similarly, the UE can receive a PDSCH with a deactivation MAC CE command for semi-persistent CSI resource setting(s). The UE assumes the semi-persistent ZP-CSI-RS resource(s) indicated in the deactivation MAC CE command are deactivated starting from the first slot after slot $n+3N_{slot}^{subframe,\mu}$ where n is the slot where the UE would transmit a PUCCH with ACK-NACK information for the PDSCH providing the deactivation command.

Similarly, activation/deactivation commands are also defined in NR Rel-15 for activating/deactivating semi-persistent CSI report setting(s) and semi-persistent SRS (sounding reference signal) resources. It should be noted that this is a similar timeline (i.e., starting from the first slot after slot $n+3N_{slot}^{subframe,\mu}$) as to when the UE can assume the activation/deactivation information in the MAC CE command can takes effect.

The benefit of defining a timeline as to when the UE can assume the activation/deactivation information in the MAC CE command can take effect is to ensure a similar understanding between the gNB and the UE as to what information is assumed. Improved systems and methods for activation/deactivation information are needed.

There currently exist certain challenge(s). When the HARQ feedback is disabled for a UE, it is a problem on how to transmit the HARQ ACK/NACK related to critical MAC CE commands described above. Furthermore, as the one way delay in a NTN can be much larger than terrestrial networks, an ACK/NACK transmitted by the UE in slot n may not reach the gNB until after the one way delay. This one way delay is usually larger than $3N_{slot}^{subframe,\mu}$, so using the existing NR Rel-15 timelines as to when the UE can assume the activation/deactivation information in the MAC CE command can takes effect will lead to a mismatch between what the UE assumes and what the gNB assumes.

Some embodiments of the present disclosure relate to embodiments where the round-trip propagation delay is longer than usual, e.g., longer than four ms, such as for an In-the-Sky (ITS) radio access node. As used herein, an ITS radio access node is a radio access node implemented in a flying structure such as, e.g., a Low Earth Orbit (LEO) satellite, a drone, a balloon, or the like. It should be noted that while the focus of the description provided herein is on an ITS radio access node, the concepts disclosed herein are equally applicable to any system with increased round-trip propagation delay.

Also, in some situations with a decentralized radio network, the round-trip propagation delay may also be increased. For instance, digital base band signals may be streamed to radio equipment at a distant location, perhaps over Gigabit Ethernet links. In this way, the radio network nodes can all be operated in a central location for a region. This may lead to situations where the round-trip propagation delay is increased. Additionally, the embodiments disclosed herein allow for additional configurability of the wireless devices. For instance, if the round-trip propagation delay changes over time, then these procedures can be reevaluated in order to adjust to these changing environments.

SUMMARY

Systems and methods for reliable Medium Access Control (MAC) Control Element (CE) ACK/NACK confirmation are provided. In some embodiments, a method performed by a wireless device for transmitting feedback includes: being configured with at least one feedback enabled Hybrid Automatic Repeat Request (HARQ) process while the remaining HARQ processes of the wireless device have feedback disabled; receiving an activation/deactivation command requiring feedback, where the receiving uses the at least one feedback enabled HARQ process; and/or transmitting feedback regarding the activation/deactivation command. In this way, the wireless device is enabled to send HARQ ACK/NACK feedback related to critical activation/deactivation MAC CE commands in a Non-Terrestrial Network (NTN). Furthermore, in the presence of large one way delay, this ensures that there is no mismatch between the base station and the wireless device as to when the wireless device can assume the activation/deactivation information in the MAC CE command can takes effect at the wireless device.

Certain aspects of the present disclosure and their embodiments may provide solutions to the aforementioned or other challenges. A solution is proposed on enabling HARQ ACK/NACK feedback related to critical activation/deactivation MAC CE commands in an NTN network. This is achieved by requiring that at least one HARQ process has feedback enabled and requiring that a PDSCH carrying a critical activation/deactivation MAC CE commands are scheduled with the at least one HARQ process that has feedback enabled.

Some embodiments herein also propose solutions on UE procedures on how to handle cases when a PDSCH carrying a critical activation/deactivation MAC CE commands are scheduled with a HARQ process that has feedback disabled. In one particular solution, this case is handled such that the UE does not apply the information in the activation/deactivation MAC CE command.

To avoid mismatch between the gNB and UE as to when the UE can assume the activation/deactivation information in the MAC CE command can takes effect at the UE, some embodiments herein propose a revised timeline where the information in the MAC CE command are assumed at the UE to be applied from the first slot after slot $n+X*N_{slot}^{subframe,\mu}$, where X is a number of slots indicated to the UE from the gNB.

There are, proposed herein, various embodiments which address one or more of the issues disclosed herein. In some embodiments, a method performed by a wireless device for transmitting feedback includes one or more of: being configured with at least one feedback enabled HARQ process while the remaining HARQ processes of the wireless device have feedback disabled; receiving an activation/deactivation command requiring feedback, where the receiving uses the at least one feedback enabled HARQ process; and transmitting feedback regarding the activation/deactivation command. In some embodiments, the method also optionally includes one or more of: receiving a second activation/deactivation command requiring feedback, where the receiving uses one of the feedback disabled HARQ processes; and not applying the information in the second activation/deactivation command.

In some embodiments, a method performed by a base station for receiving feedback includes one or more of: transmitting, to a wireless device, an activation/deactivation command requiring feedback, where the transmitting uses at least one feedback enabled HARQ process of the wireless device while the remaining HARQ processes of the wireless device have feedback disabled; and receiving, from the wireless device, feedback regarding the activation/deactivation command. In some embodiments, the method also optionally includes, prior to transmitting the activation/deactivation command, configuring the wireless device with at least one feedback enabled HARQ process while the remaining HARQ processes of the wireless device have feedback disabled. In some embodiments, the method also optionally includes one or more of: transmitting, to the wireless device, a second activation/deactivation command requiring feedback using one of the feedback disabled HARQ processes; and determining that the wireless device does not apply the information in the second activation/deactivation command.

In some embodiments, receiving the activation/deactivation command comprises receiving, from the network node, a first PDSCH carrying a MAC CE activation/deactivation command requiring a HARQ ACK/NACK feedback on PUCCH using the at least one feedback enabled HARQ process.

In some embodiments, transmitting the feedback comprises transmitting HARQ ACK/NACK feedback on PUCCH in slot n corresponding to the first PDSCH on PUCCH.

In some embodiments, the wireless device assumes that information related to the MAC CE activation/deactivation command is applied at the wireless device from a first slot after slot $n+X*N_{slot}^{subframe,\mu}$.

In some embodiments, the value of X will be indicated as part of wireless device specific RRC configuration. In some embodiments, the value of X will be indicated as part of the system information (e.g., a SIB).

In some embodiments, not applying the information comprises ignoring the second activation/deactivation command.

In some embodiments, the activation/deactivation command comprises an activation/deactivation MAC CE for PDSCH giving mapping of one or more TCI States to the codepoints of the TCI field of the DCI.

In some embodiments, the activation/deactivation command comprises an activation/deactivation MAC CE for an sCell. In some embodiments, the activation/deactivation command comprises an activation/deactivation MAC CE for spatial relation update of PUCCH. In some embodiments, the activation/deactivation command comprises an activation/deactivation MAC CE for providing TCI state information for a CORESET.

In some embodiments, the activation/deactivation command comprises an activation/deactivation MAC CE ZP CSI-RS. In some embodiments, the activation/deactivation command comprises an activation/deactivation MAC CE for semi-persistent CSI resource settings. In some embodiments, the activation/deactivation command comprises an activation/deactivation MAC CE for semi-persistent CSI report settings. In some embodiments, the activation/deactivation command comprises an activation/deactivation MAC CE for semi-persistent SRS.

Certain embodiments may provide one or more of the following technical advantage(s). The proposed solution enables the UE to send HARQ ACK/NACK feedback related to critical activation/deactivation MAC CE commands in an NTN network. Furthermore, in the presence of large one way delay, the proposed solution ensures that there is no mismatch between the gNB and the UE as to when the UE can assume the activation/deactivation information in the MAC CE command can takes effect at the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 13 is a flowchart illustrating a method implemented in a communication system in accordance with one embodiment of the present disclosure;

FIG. 14 is a flowchart illustrating a method implemented in a communication system in accordance with one embodiment of the present disclosure;

DETAILED DESCRIPTION

Figure 1:
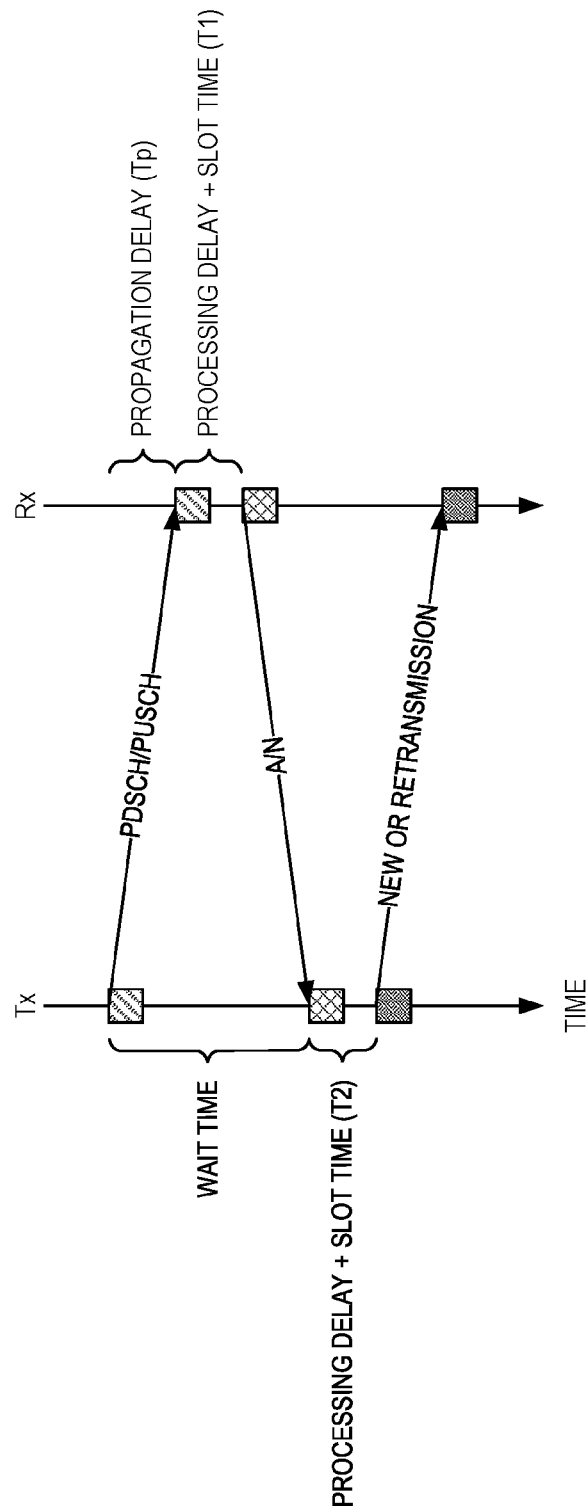
FIG. 1 shows the various delays associated with the HARQ procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit or a network node that implements a gNB Distributed Unit) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
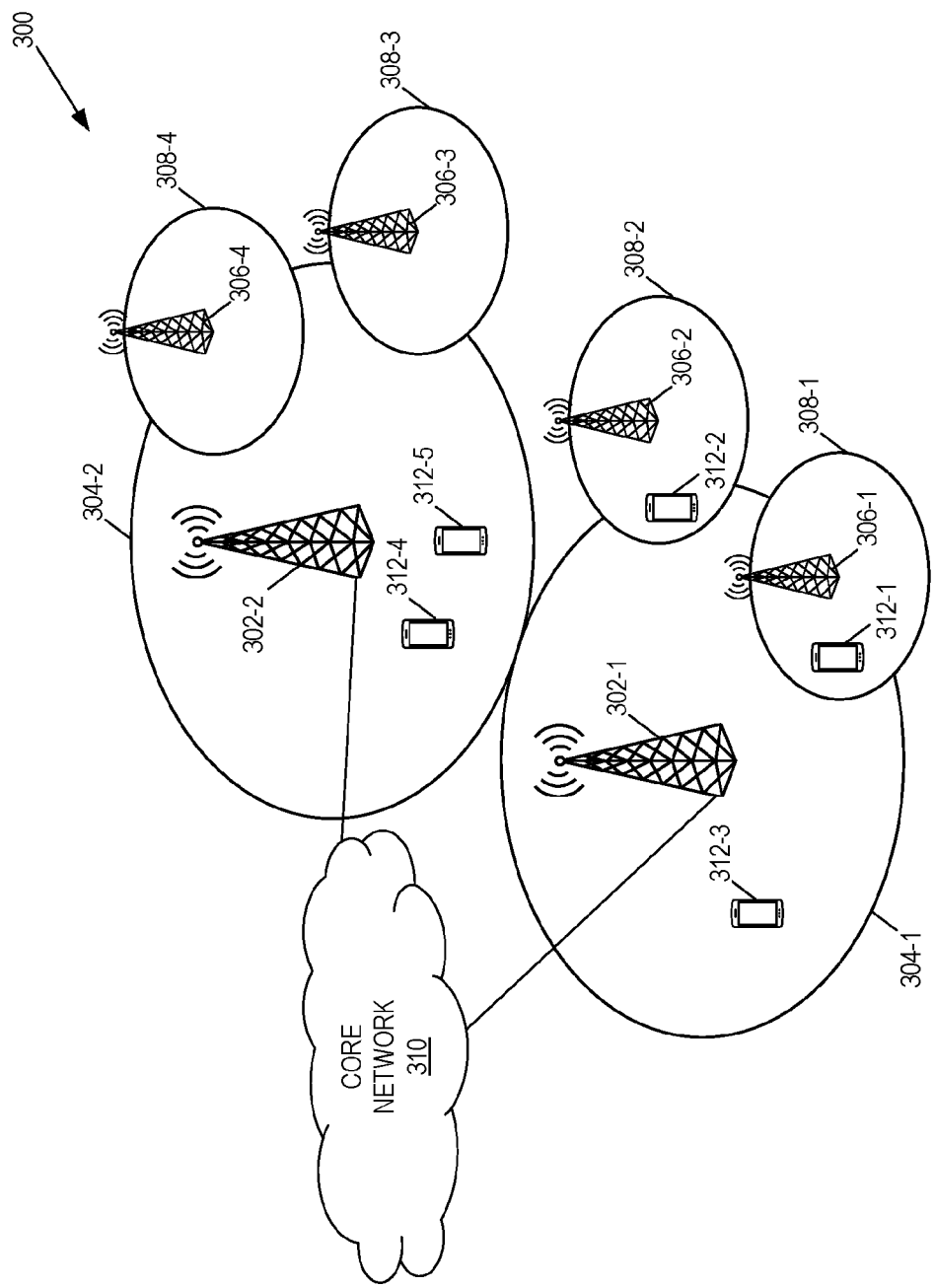
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including a NR RAN. In this example, the RAN includes base stations 302-1 and 302-2, which in 5G NR are referred to as gNBs (e.g., LTE RAN nodes connected to 5GC, which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

The benefit of defining a timeline as to when the UE can assume the activation/deactivation information in the MAC CE command can take effect is to ensure a similar understanding between the gNB and the UE as to what information is assumed. Improved systems and methods for activation/deactivation information are needed.

The benefit of defining a timeline as to when the UE can assume the activation/deactivation information in the MAC CE command can take effect is to ensure a similar understanding between the gNB and the UE as to what information is assumed. Improved systems and methods for activation/deactivation information are needed.

There currently exist certain challenges. When the HARQ feedback is disabled for a UE, it is a problem on how to transmit the HARQ ACK/NACK related to critical MAC CE commands described above. Furthermore, as the one way delay in a NTN can be much larger than terrestrial networks, an ACK/NACK transmitted by the UE in slot n may not reach the gNB until after the one way delay. This one way delay is usually larger than $3N_{slot}^{subframe,\mu}$, so using the existing NR Rel-15 timelines as to when the UE can assume the activation/deactivation information in the MAC CE command can takes effect will lead to a mismatch between what the UE assumes and what the gNB assumes.

Some embodiments of the present disclosure relate to embodiments where the round-trip propagation delay is longer than usual, e.g., longer than four ms, such as for an In-the-Sky (ITS) radio access node. As used herein, an ITS radio access node is a radio access node implemented in a flying structure such as, e.g., a Low Earth Orbit (LEO) satellite, a drone, a balloon, or the like. It should be noted that while the focus of the description provided herein is on an ITS radio access node, the concepts disclosed herein are equally applicable to any system with increased round-trip propagation delay.

Also, in some situations with a decentralized radio network, the round-trip propagation delay may also be increased. For instance, digital base band signals may be streamed to radio equipment at a distant location, perhaps over Gigabit Ethernet links. In this way, the radio network nodes can all be operated in a central location for a region. This may lead to situations where the round-trip propagation delay is increased. Additionally, the embodiments disclosed herein allow for additional configurability of the wireless devices. For instance, if the round-trip propagation delay changes over time, then these procedures can be reevaluated in order to adjust to these changing environments.

Systems and methods for reliable Medium Access Control (MAC) Control Element (CE) ACK/NACK confirmation are provided. In some embodiments, a method performed by a wireless device for transmitting feedback includes: being configured with at least one feedback enabled Hybrid Automatic Repeat Request (HARQ) process while the remaining HARQ processes of the wireless device have feedback disabled; receiving an activation/deactivation command requiring feedback, where the receiving uses the at least one feedback enabled HARQ process; and/or transmitting feedback regarding the activation/deactivation command. In this way, the wireless device is enabled to send HARQ ACK/NACK feedback related to critical activation/deactivation MAC CE commands in a Non-Terrestrial Network (NTN). Furthermore, in the presence of large one way delay, this ensures that there is no mismatch between the base station and the wireless device as to when the wireless device can assume the activation/deactivation information in the MAC CE command can takes effect at the wireless device.

Figure 4:
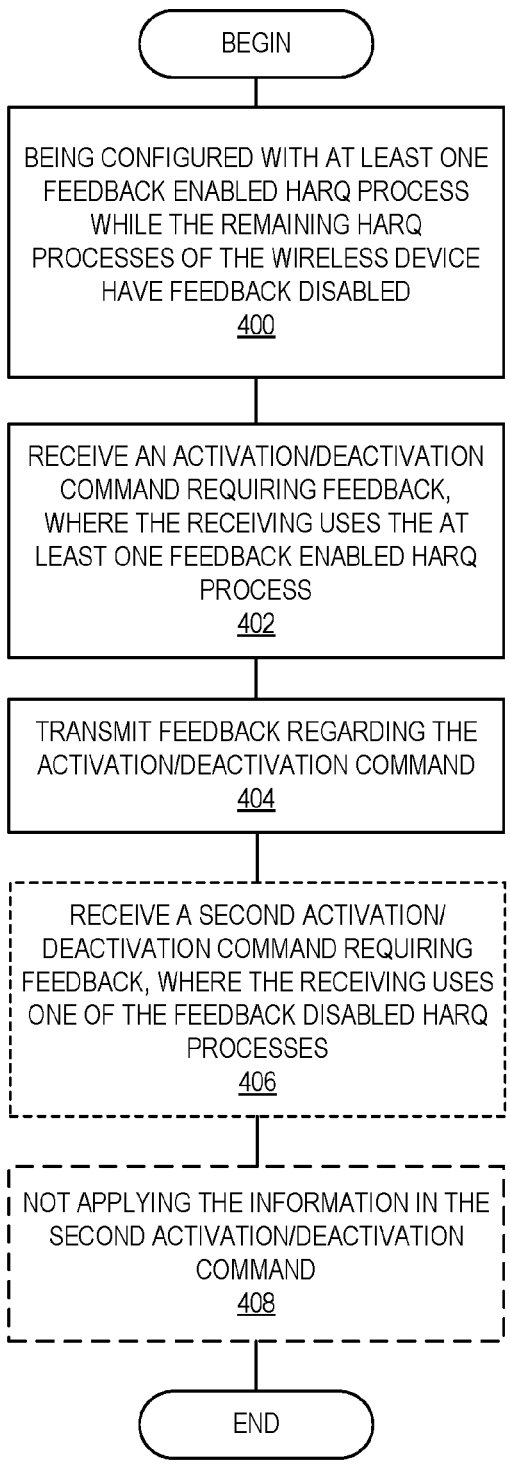
FIG. 4 illustrates the operation of a wireless device for transmitting feedback, according to some embodiments of the current disclosure.

FIG. 4 illustrates the operation of a wireless device for transmitting feedback, according to some embodiments of the current disclosure. In some embodiments, a method performed by a wireless device for transmitting feedback includes one or more of: being configured with at least one feedback enabled HARQ process while the remaining HARQ processes of the wireless device have feedback disabled (step 400); receiving an activation/deactivation command requiring feedback, where the receiving uses the at least one feedback enabled HARQ process (step 402); and transmitting feedback regarding the activation/deactivation command (step 404). In some embodiments, the method also optionally includes one or more of: receiving a second activation/deactivation command requiring feedback, where the receiving uses one of the feedback disabled HARQ processes (step 406); and not applying the information in the second activation/deactivation command (step 408).

Some embodiments enable the UE to send HARQ ACK/NACK feedback related to critical activation/deactivation MAC CE commands in an NTN network. Furthermore, in the presence of large one way delay, the proposed solution ensures that there is no mismatch between the gNB and the UE as to when the UE can assume the activation/deactivation information in the MAC CE command can takes effect at the UE.

Figure 5:
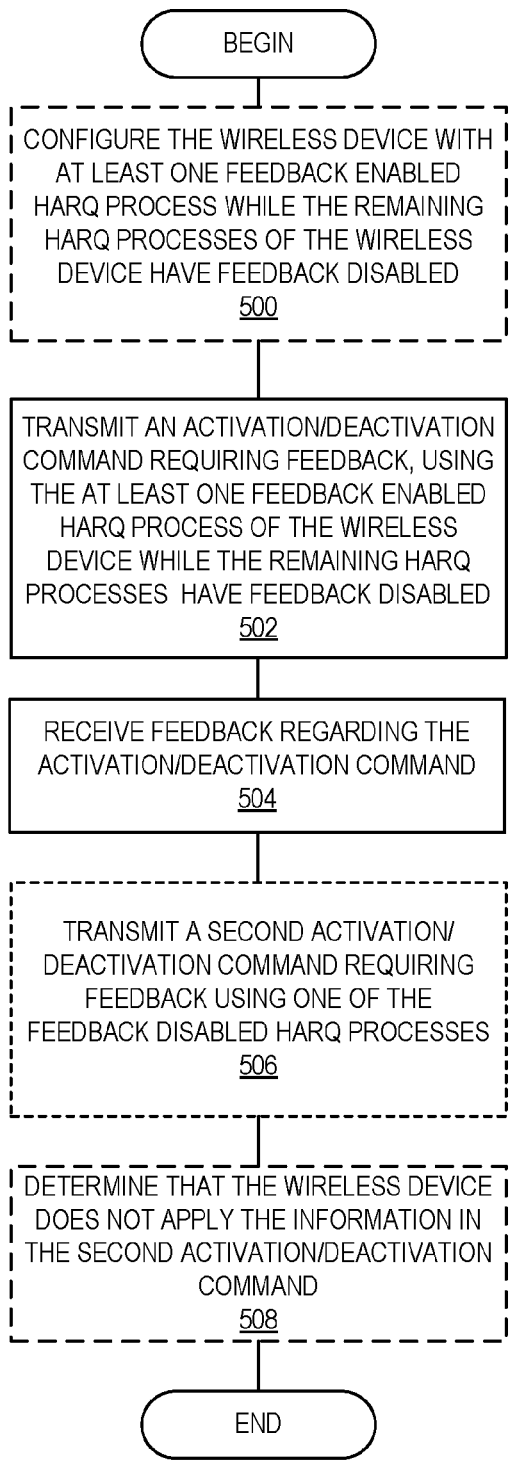
FIG. 5 illustrates the operation of a base station for receiving feedback, according to some embodiments of the current disclosure.

FIG. 5 illustrates the operation of a base station for receiving feedback, according to some embodiments of the current disclosure. In some embodiments, a method performed by a base station for receiving feedback includes one or more of: transmitting, to a wireless device, an activation/deactivation command requiring feedback, where the transmitting uses at least one feedback enabled HARQ process of the wireless device while the remaining HARQ processes of the wireless device have feedback disabled (step 502); and receiving, from the wireless device, feedback regarding the activation/deactivation command (step 504). In some embodiments, the method also optionally includes, prior to transmitting the activation/deactivation command, configuring the wireless device with at least one feedback enabled HARQ process while the remaining HARQ processes of the wireless device have feedback disabled (step 500). In some embodiments, the method also optionally includes one or more of: transmitting, to the wireless device, a second activation/deactivation command requiring feedback using one of the feedback disabled HARQ processes (step 506); and determining that the wireless device does not apply the information in the second activation/deactivation command (step 508).

Some embodiments enable the UE to send HARQ ACK/NACK feedback related to critical activation/deactivation MAC CE commands in an NTN network. Furthermore, in the presence of large one way delay, the proposed solution ensures that there is no mismatch between the gNB and the UE as to when the UE can assume the activation/deactivation information in the MAC CE command can takes effect at the UE.

In one embodiment, to enable the UE to feedback HARQ ACK/NACK related to critical MAC CE commands, at least one HARQ process is enabled for the UE. In some cases, one HARQ process is enabled while in some other cases, a small subset of HARQ processes (e.g., 2-4) is enabled. Using this embodiment, when a UE receives a PDSCH with an activation/deactivation MAC CE command requiring a HARQ ACK/NACK feedback on PUCCH, then this PDSCH is scheduled in DCI where the DCI indicates a HARQ process that that has feedback enabled. Consider a simple example, where the UE is first configured with the following:

HARQ processes with HARQ process IDs 0-1 are feedback enabled

HARQ processes with HARQ process IDs 3-15 are feedback disabled

In the above example, the UE is expected to receive the PDSCHs with an activation/deactivation MAC CE command requiring a HARQ ACK/NACK feedback on PUCCH to be scheduled using HARQ processes with HARQ process ID 0 or 1. That is, the DCI scheduling this PDSCH indicates the HARQ process ID as either 0 or 1. The UE would consequently decode the PDSCH and transmit the HARQ ACK/NACK feedback on PUCCH.

Another issue is what happens when the UE is scheduled with a PDSCH with an activation/deactivation MAC CE command using a HARQ process that has feedback disabled. That is, the DCI, which schedules the PDSCH carrying the MAC CE command, indicates a HARQ process ID that corresponds to a feedback disabled HARQ process. There are two possible solutions for this issue:

In one embodiment, when a UE receives a MAC CE command using a HARQ process that has feedback disabled, the UE ignores the MAC CE command and does not apply the information indicated in the MAC CE activation/deactivation command. As a result, the UE does not send a related HARQ ACK/NACK on PUCCH. For example, consider a UE receiving an activation MAC CE command for PDSCH giving mapping of one or more TCI States to the codepoints of the TCI field of the DCI. If this activation MAC CE command is received using a feedback disabled HARQ process, then the UE ignores the MAC CE activation/deactivation command and does not apply the indicated mapping of one or more TCI States to the codepoints of the TCI field of the DCI. Similar UE procedures to the one shown in this example are applicable to other MAC CEs related to the following:

Activation/deactivation of a sCell: UE does not apply/assume activation/deactivation of the sCell if the MAC CE command is received using a feedback disabled HARQ process.

Activation of spatial relation information for PUCCH: UE does not assume activation/deactivation of the spatial relation information for PUCCH if the MAC CE command is received using a feedback disabled HARQ process.

Activation/deactivation of TCI state information for CORESET: UE does not assume activation/deactivation of the TCI state information for CORESET if the MAC CE command is received using a feedback disabled HARQ process.

Activation/deactivation of ZP (zero-power) CSI-RS (channel state information reference signal) resource sets: UE does not assume activation/deactivation of the semi-persistent ZP CSI-RS resource(s) if the MAC CE command is received using a feedback disabled HARQ process.

Activation/deactivation of semi-persistent CSI resource settings: UE does not assume activation/deactivation of the semi-persistent CSI resource setting(s) if the MAC CE command is received using a feedback disabled HARQ process.

Activation/deactivation of semi-persistent CSI report settings: UE does not assume activation/deactivation of the semi-persistent CSI report setting(s) if the MAC CE command is received using a feedback disabled HARQ process.

Activation/deactivation of semi-persistent SRS: UE does not assume activation/deactivation of the semi-persistent SRS resource(s) if the MAC CE command is received using a feedback disabled HARQ process.

In an alternative embodiment, when a UE receives a PDSCH carrying a MAC CE command requiring HARQ ACK/NACK feedback using a HARQ process that has feedback disabled, the UE will override the disabling of HARQ ACK/NACK feedback and will apply the information indicated in the MAC CE activation/deactivation command. For this case, the UE will send a related HARQ ACK/NACK on PUCCH. The overriding of disabling of HARQ ACK/NACK feedback will only be applied if the PDSCH carries a MAC CE command requiring HARQ ACK/NACK feedback. If a PDSCH does not carry a MAC CE command requiring HARQ ACK/NACK feedback, and this PDSCH is scheduled using a feedback disabled HARQ process, then there is no HARQ ACK/NACK feedback on PUCCH for this PDSCH (i.e., HARQ ACK/NACK feedback overriding is not applied).

In an alternative embodiment, when a UE receives a PDSCH carrying a MAC CE command requiring HARQ ACK/NACK feedback using a HARQ process that has feedback disabled, the UE performs the following:

If the PDSCH is correctly decoded, the UE
  determine the HARQ-ACK feedback slot n based on the field PDSCH-to-HARQ_feedback timing indicator in the DCI scheduling,
  does not transmit HARQ ACK feedback in the slot n
  apply the action indicated by the MAC CE command in the slot $n+3*N_{slot}^{subframe,\mu}+1$ or the first applicable slot after the slot $n+3*N_{slot}^{subframe,\mu}+1$ or the first slot after the slot $n+3*N_{slot}^{subframe,\mu}$ Otherwise, the UE
  discards the PDSCH and does not transmit HARQ NACK feedback Since UE does not transmit HARQ ACK/NACK feedback in this case, there may be an ambiguity period between the UE and gNB for the MAC CE application timing. The ambiguity can be solved by gNB implementation. For example, gNB can use robust transmission to transmit the PDSCH carrying the MAC CE command and the corresponding scheduling a Physical Downlink Control Channel (PDCCH) to mitigate the uncertainty.

Figure 2:
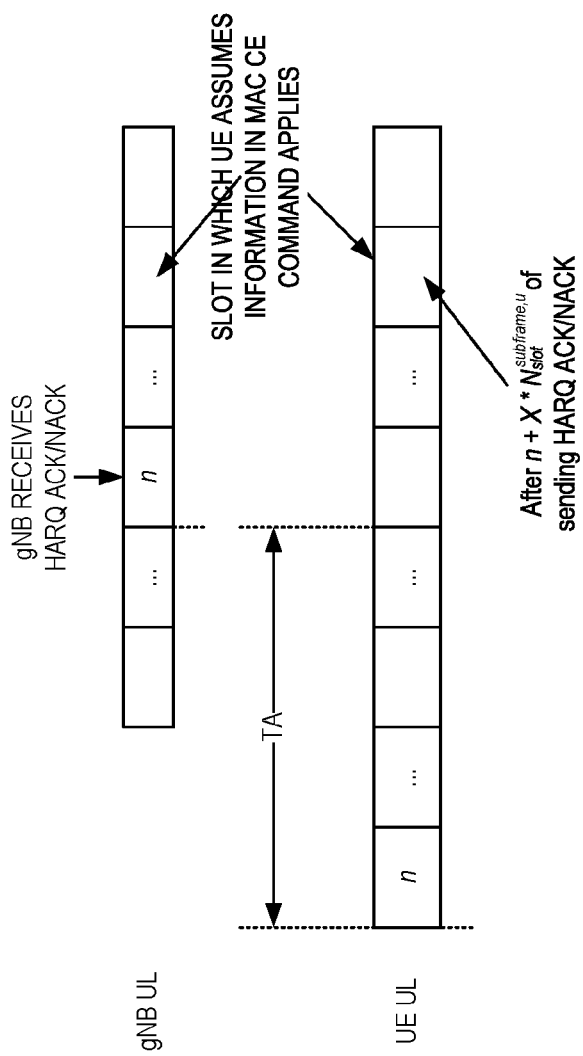
FIG. 2 illustrates a revised timeline on when the information is applied at the UE.

To solve the issue of ensuring that the gNB and the UE will have the same understanding on when the information in the MAC CE command takes effect at the UE, a revised timeline on when the information is applied at the UE is provided. The revised timeline is shown in FIG. 2 where there is a timing advance applied to the UL frame timing of the UE compared to the gNB UL timing. This timing advance is to compensate for the large one way delay. In this case, when the UE sends a HARQ ACK/NACK related to the MAC CE command in slot n, the gNB receives the HARQ ACK/NACK much later (i.e., after a one way delay). Then, to compensate for this delay, the information in the MAC CE command is assumed at the UE to be applied in the slot $n+X*N_{slot}^{subframe,\mu}+1$ or the first applicable slot after the slot $n+X*N_{slot}^{subframe,\mu}+1$ or from the first slot after slot $n+X*N_{slot}^{subframe,\mu}$, where X is a number of slots indicated to the UE from the gNB. In some embodiments, the value of X will be indicated as part of the system information (i.e., SIB). In other embodiments, the value of X will be indicated as part of UE specific RRC configuration to the UE.

In some embodiments, between slots n and $n+X*N_{slot}^{subframe,\mu}$ at the UE, the UE is expected to be scheduled with data reliably. In some embodiment, to ensure reliable scheduling, a default TCI state may be assumed for PDSCH scheduling. The default TCI state may be the TCI state associated with the PDCCH.

Figure 6:
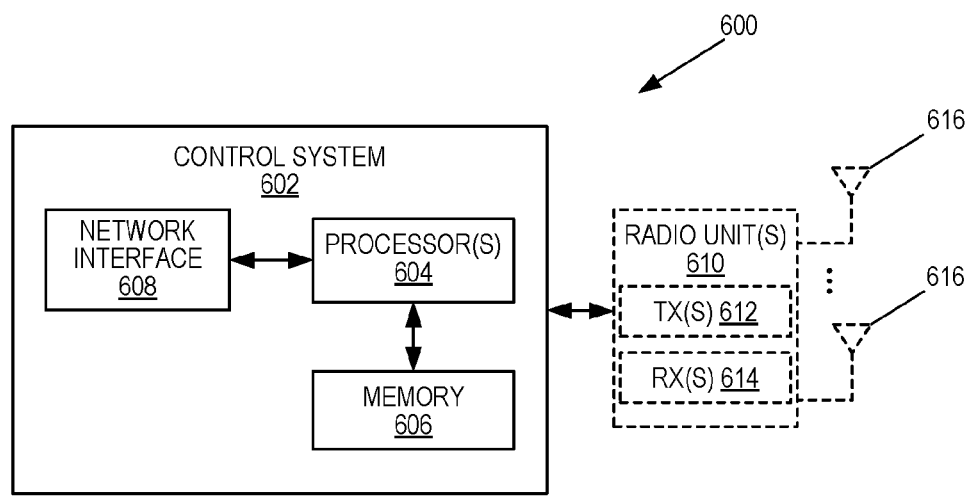
FIG. 6 is a schematic block diagram of a radio access node according to some embodiments of the present disclosure.

FIG. 6 is a schematic block diagram of a radio access node 600 according to some embodiments of the present disclosure. Optional features are represented by dashed boxes. The radio access node 600 may be, for example, a base station 302 or 306 or a network node that implements all or part of the functionality of the base station 302 or gNB described herein. As illustrated, the radio access node 600 includes a control system 602 that includes one or more processors 604 (e.g., Central Processing Units (CPUs), Application Specific Integrated Circuits (ASICs), Field Programmable Gate Arrays (FPGAS), and/or the like), memory 606, and a network interface 608. The one or more processors 604 are also referred to herein as processing circuitry. In addition, the radio access node 600 may include one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 as described herein. In some embodiments, the function(s) are implemented in software that is stored, e.g., in the memory 606 and executed by the one or more processors 604.

Figure 7:
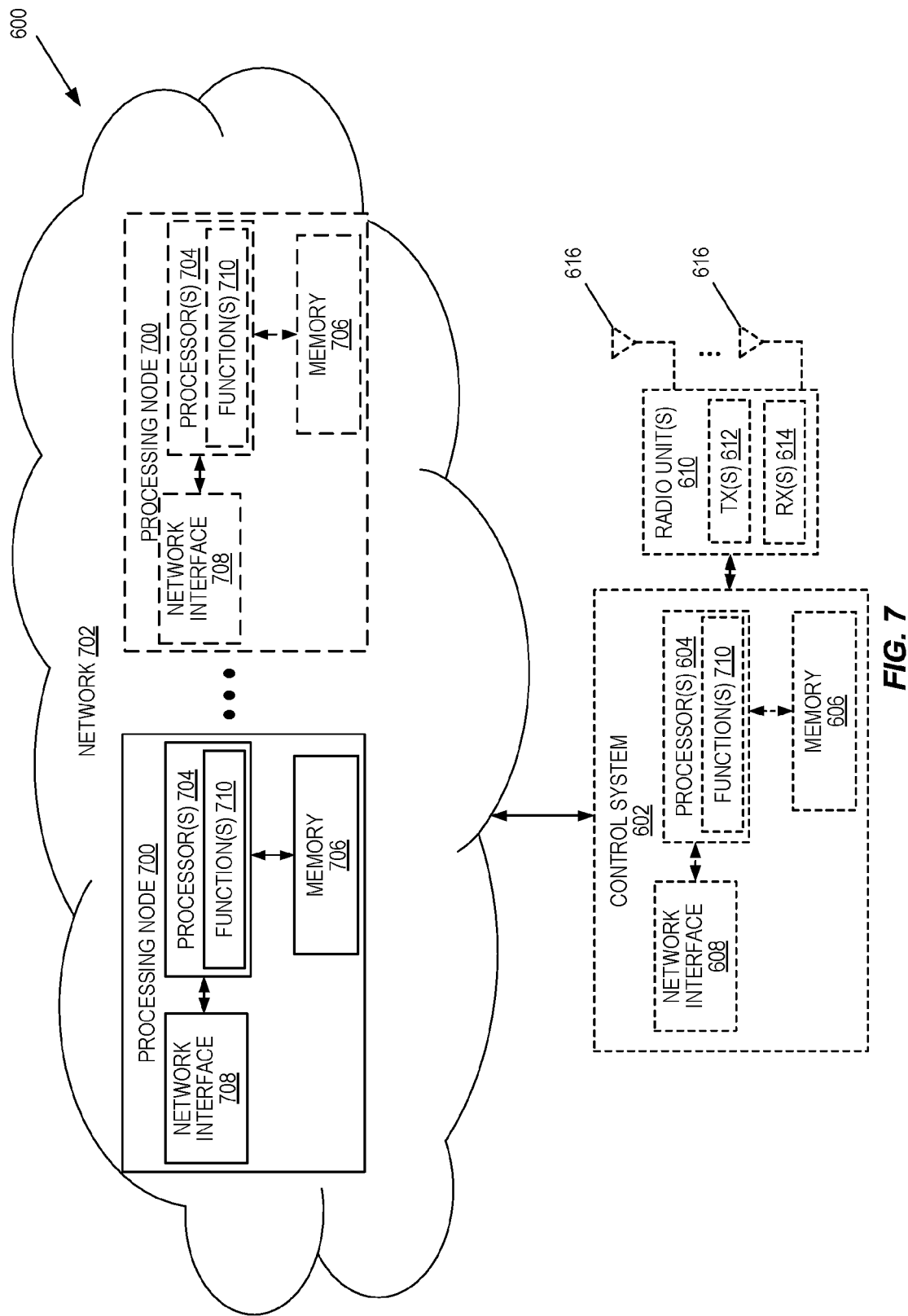
FIG. 7 is a schematic block diagram that illustrates a virtualized embodiment of the radio access node of FIG. 12 according to some embodiments of the present disclosure.

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 may include the control system 602 and/or the one or more radio units 610, as described above. The control system 602 may be connected to the radio unit(s) 610 via, for example, an optical cable or the like. The radio access node 600 includes one or more processing nodes 700 coupled to or included as part of a network(s) 702. If present, the control system 602 or the radio unit(s) are connected to the processing node(s) 700 via the network 702. Each processing node 700 includes one or more processors 704 (e.g., CPUs, ASICs, FPGAS, and/or the like), memory 706, and a network interface 708.

In this example, functions 710 of the radio access node 600 described herein are implemented at the one or more processing nodes 700 or distributed across the one or more processing nodes 700 and the control system 602 and/or the radio unit(s) 610 in any desired manner. In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of radio access node 600 or a node (e.g., a processing node 700) implementing one or more of the functions 710 of the radio access node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
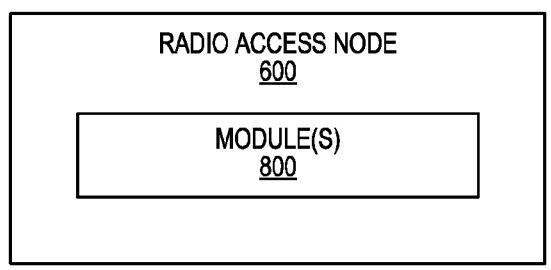
FIG. 8 is a schematic block diagram of the radio access node of FIG. 6 according to some other embodiments of the present disclosure.

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
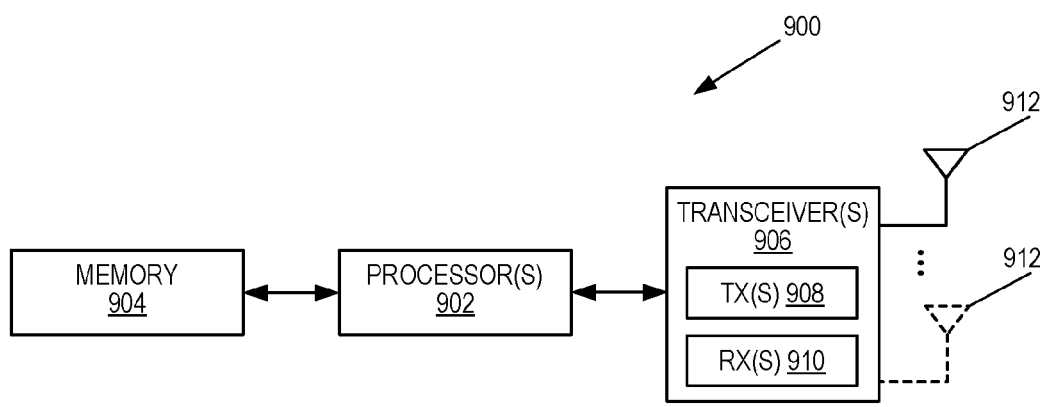
FIG. 9 is a schematic block diagram of a User Equipment device (UE) according to some embodiments of the present disclosure.

FIG. 9 is a schematic block diagram of a wireless communication device 900 according to some embodiments of the present disclosure. As illustrated, the wireless communication device 900 includes one or more processors 902 (e.g., CPUs, ASICS, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the wireless communication device 900 described above may be fully or partially implemented in software that is, e.g., stored in the memory 904 and executed by the processor(s) 902. Note that the wireless communication device 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, a computer program including instructions which, when executed by at least one processor, causes the at least one processor to carry out the functionality of the wireless communication device 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
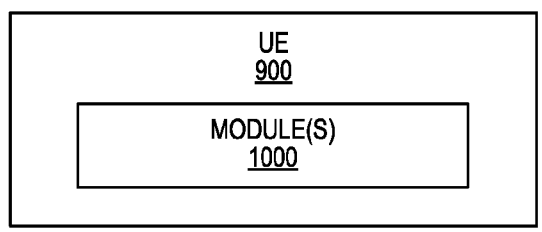
FIG. 10 is a schematic block diagram of the UE of FIG. 9 according to some other embodiments of the present disclosure.

FIG. 10 is a schematic block diagram of the wireless communication device 900 according to some other embodiments of the present disclosure. The wireless communication device 900 includes one or more modules 1000, each of which is implemented in software. The module(s) 1000 provide the functionality of the wireless communication device 900 described herein.

Figure 11:
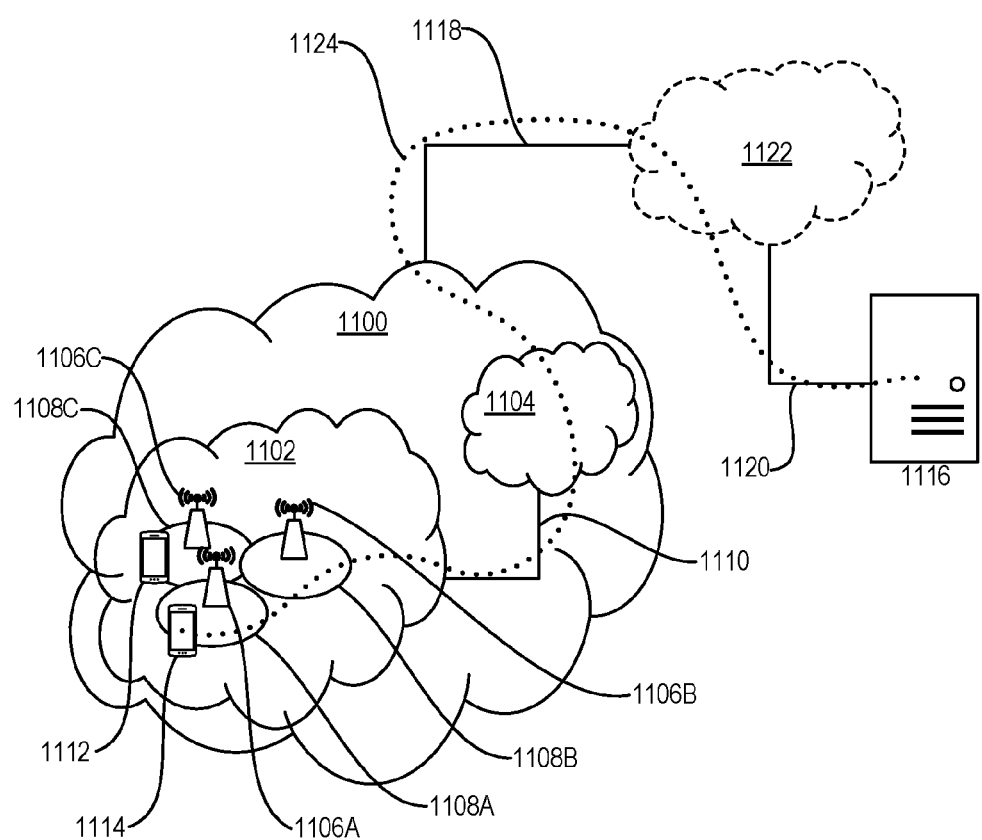
FIG. 11 illustrates a telecommunication network connected via an intermediate network to a host computer in accordance with some embodiments of the present disclosure.

With reference to FIG. 11, in accordance with an embodiment, a communication system includes a telecommunication network 1100, such as a 3GPP-type cellular network, which comprises an access network 1102, such as a RAN, and a core network 1104. The access network 1102 comprises a plurality of base stations 1106A, 1106B, 1106C, such as Node Bs, eNBs, gNBs, or other types of wireless Access Points (APs), each defining a corresponding coverage area 1108A, 1108B, 1108C. Each base station 1106A, 1106B, 1106C is connectable to the core network 1104 over a wired or wireless connection 1110. A first UE 1112 located in coverage area 1108C is configured to wirelessly connect to, or be paged by, the corresponding base station 1106C. A second UE 1114 in coverage area 1108A is wirelessly connectable to the corresponding base station 1106A. While a plurality of UEs 1112, 1114 are illustrated in this example, the disclosed embodiments are equally applicable to a situation where a sole UE is in the coverage area or where a sole UE is connecting to the corresponding base station 1106.

The telecommunication network 1100 is itself connected to a host computer 1116, which may be embodied in the hardware and/or software of a standalone server, a cloud-implemented server, a distributed server, or as processing resources in a server farm. The host computer 1116 may be under the ownership or control of a service provider, or may be operated by the service provider or on behalf of the service provider. Connections 1118 and 1120 between the telecommunication network 1100 and the host computer 1116 may extend directly from the core network 1104 to the host computer 1116 or may go via an optional intermediate network 1122. The intermediate network 1122 may be one of, or a combination of more than one of, a public, private, or hosted network; the intermediate network 1122, if any, may be a backbone network or the Internet; in particular, the intermediate network 1122 may comprise two or more sub-networks (not shown).

The communication system of FIG. 11 as a whole enables connectivity between the connected UEs 1112, 1114 and the host computer 1116. The connectivity may be described as an Over-the-Top (OTT) connection 1124. The host computer 1116 and the connected UEs 1112, 1114 are configured to communicate data and/or signaling via the OTT connection 1124, using the access network 1102, the core network 1104, any intermediate network 1122, and possible further infrastructure (not shown) as intermediaries. The OTT connection 1124 may be transparent in the sense that the participating communication devices through which the OTT connection 1124 passes are unaware of routing of uplink and downlink communications. For example, the base station 1106 may not or need not be informed about the past routing of an incoming downlink communication with data originating from the host computer 1116 to be forwarded (e.g., handed over) to a connected UE 1112. Similarly, the base station 1106 need not be aware of the future routing of an outgoing uplink communication originating from the UE 1112 towards the host computer 1116.

Example implementations, in accordance with an embodiment, of the UE, base station, and host computer discussed in the preceding paragraphs will now be described with reference to FIG. 12. In a communication system 1200, a host computer 1202 comprises hardware 1204 including a communication interface 1206 configured to set up and maintain a wired or wireless connection with an interface of a different communication device of the communication system 1200. The host computer 1202 further comprises processing circuitry 1208, which may have storage and/or processing capabilities. In particular, the processing circuitry 1208 may comprise one or more programmable processors, ASICs, FPGAs, or combinations of these (not shown) adapted to execute instructions. The host computer 1202 further comprises software 1210, which is stored in or accessible by the host computer 1202 and executable by the processing circuitry 1208. The software 1210 includes a host application 1212. The host application 1212 may be operable to provide a service to a remote user, such as a UE 1214 connecting via an OTT connection 1216 terminating at the UE 1214 and the host computer 1202. In providing the service to the remote user, the host application 1212 may provide user data which is transmitted using the OTT connection 1216.

The communication system 1200 further includes a base station 1218 provided in a telecommunication system and comprising hardware 1220 enabling it to communicate with the host computer 1202 and with the UE 1214. The hardware 1220 may include a communication interface 1222 for setting up and maintaining a wired or wireless connection with an interface of a different communication device of the communication system 1200, as well as a radio interface 1224 for setting up and maintaining at least a wireless connection 1226 with the UE 1214 located in a coverage area (not shown in FIG. 12) served by the base station 1218. The communication interface 1222 may be configured to facilitate a connection 1228 to the host computer 1202. The connection 1228 may be direct or it may pass through a core network (not shown in FIG. 12) of the telecommunication system and/or through one or more intermediate networks outside the telecommunication system. In the embodiment shown, the hardware 1220 of the base station 1218 further includes processing circuitry 1230, which may comprise one or more programmable processors, ASICs, FPGAs, or combinations of these (not shown) adapted to execute instructions. The base station 1218 further has software 1232 stored internally or accessible via an external connection.

The communication system 1200 further includes the UE 1214 already referred to. The UE's 1214 hardware 1234 may include a radio interface 1236 configured to set up and maintain a wireless connection 1226 with a base station serving a coverage area in which the UE 1214 is currently located. The hardware 1234 of the UE 1214 further includes processing circuitry 1238, which may comprise one or more programmable processors, ASICs, FPGAs, or combinations of these (not shown) adapted to execute instructions. The UE 1214 further comprises software 1240, which is stored in or accessible by the UE 1214 and executable by the processing circuitry 1238. The software 1240 includes a client application 1242. The client application 1242 may be operable to provide a service to a human or non-human user via the UE 1214, with the support of the host computer 1202. In the host computer 1202, the executing host application 1212 may communicate with the executing client application 1242 via the OTT connection 1216 terminating at the UE 1214 and the host computer 1202. In providing the service to the user, the client application 1242 may receive request data from the host application 1212 and provide user data in response to the request data. The OTT connection 1216 may transfer both the request data and the user data. The client application 1242 may interact with the user to generate the user data that it provides.

Figure 12:
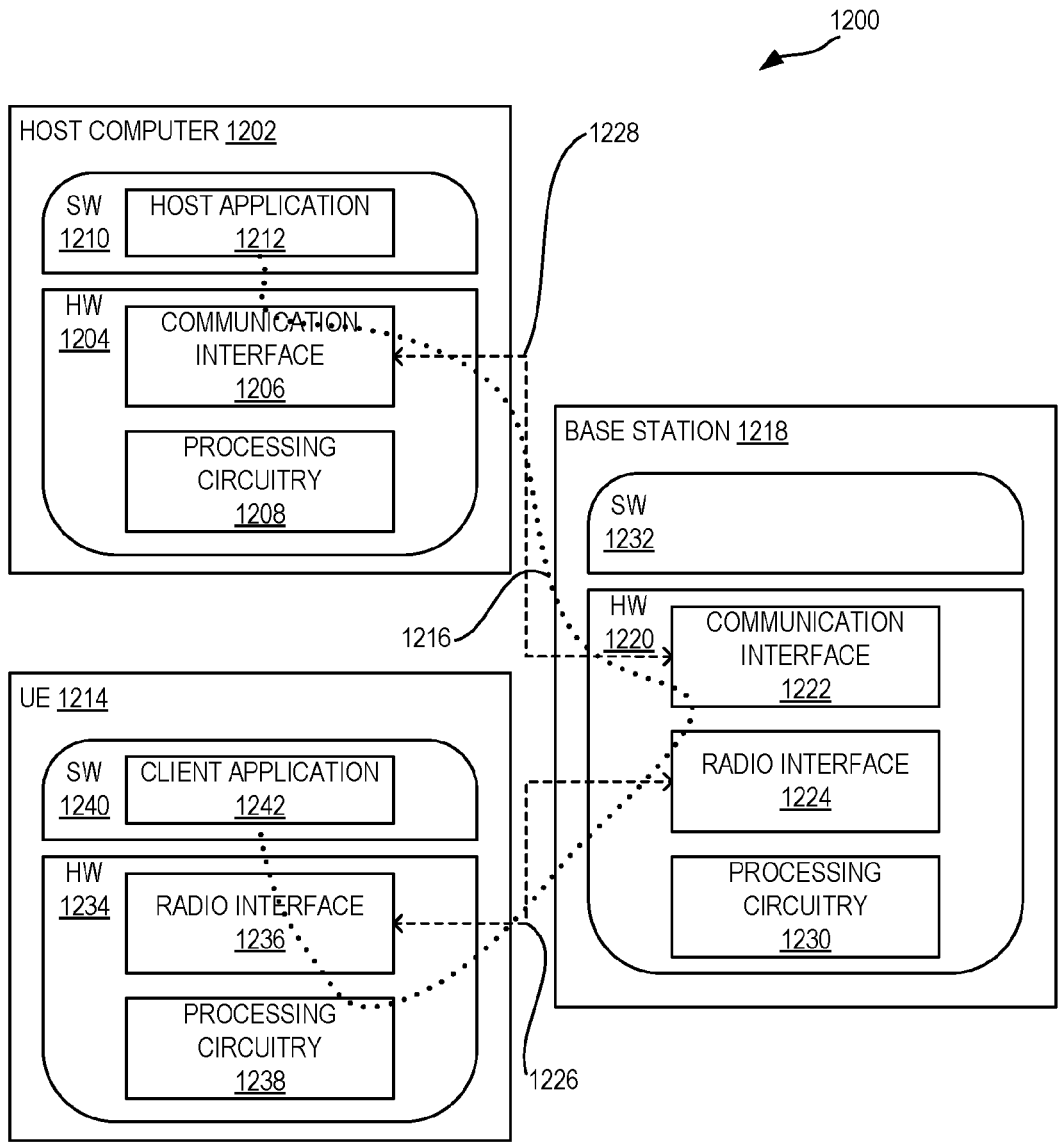
FIG. 12 is a generalized block diagram of a host computer communicating via a base station with a UE over a partially wireless connection in accordance with some embodiments of the present disclosure.

It is noted that the host computer 1202, the base station 1218, and the UE 1214 illustrated in FIG. 12 may be similar or identical to the host computer 1116, one of the base stations 1106A, 1106B, 1106C, and one of the UEs 1112, 1114 of FIG. 11, respectively. This is to say, the inner workings of these entities may be as shown in FIG. 12 and independently, the surrounding network topology may be that of FIG. 11.

In FIG. 12, the OTT connection 1216 has been drawn abstractly to illustrate the communication between the host computer 1202 and the UE 1214 via the base station 1218 without explicit reference to any intermediary devices and the precise routing of messages via these devices. The network infrastructure may determine the routing, which may be configured to hide from the UE 1214 or from the service provider operating the host computer 1202, or both. While the OTT connection 1216 is active, the network infrastructure may further take decisions by which it dynamically changes the routing (e.g., on the basis of load balancing consideration or reconfiguration of the network).

The wireless connection 1226 between the UE 1214 and the base station 1218 is in accordance with the teachings of the embodiments described throughout this disclosure. One or more of the various embodiments improve the performance of OTT services provided to the UE 1214 using the OTT connection 1216, in which the wireless connection 1226 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1216 between the host computer 1202 and the UE 1214, in response to variations in the measurement results. The measurement procedure and/or the network functionality for reconfiguring the OTT connection 1216 may be implemented in the software 1210 and the hardware 1204 of the host computer 1202 or in the software 1240 and the hardware 1234 of the UE 1214, or both. In some embodiments, sensors (not shown) may be deployed in or in association with communication devices through which the OTT connection 1216 passes; the sensors may participate in the measurement procedure by supplying values of the monitored quantities exemplified above, or supplying values of other physical quantities from which the software 1210, 1240 may compute or estimate the monitored quantities. The reconfiguring of the OTT connection 1216 may include message format, retransmission settings, preferred routing, etc.; the reconfiguring need not affect the base station 1218, and it may be unknown or imperceptible to the base station 1218. Such procedures and functionalities may be known and practiced in the art. In certain embodiments, measurements may involve proprietary UE signaling facilitating the host computer 1202's measurements of throughput, propagation times, latency, and the like. The measurements may be implemented in that the software 1210 and 1240 causes messages to be transmitted, in particular empty or 'dummy' messages, using the OTT connection 1216 while it monitors propagation times, errors, etc.

FIG. 13 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 13 will be included in this section. In step 1300, the host computer provides user data. In sub-step 1302 (which may be optional) of step 1300, the host computer provides the user data by executing a host application. In step 1304, the host computer initiates a transmission carrying the user data to the UE. In step 1306 (which may be optional), the base station transmits to the UE the user data which was carried in the transmission that the host computer initiated, in accordance with the teachings of the embodiments described throughout this disclosure. In step 1308 (which may also be optional), the UE executes a client application associated with the host application executed by the host computer.

FIG. 14 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 14 will be included in this section. In step 1400 of the method, the host computer provides user data. In an optional sub-step (not shown) the host computer provides the user data by executing a host application. In step 1402, the host computer initiates a transmission carrying the user data to the UE. The transmission may pass via the base station, in accordance with the teachings of the embodiments described throughout this disclosure. In step 1404 (which may be optional), the UE receives the user data carried in the transmission.

Figures 15, 16:
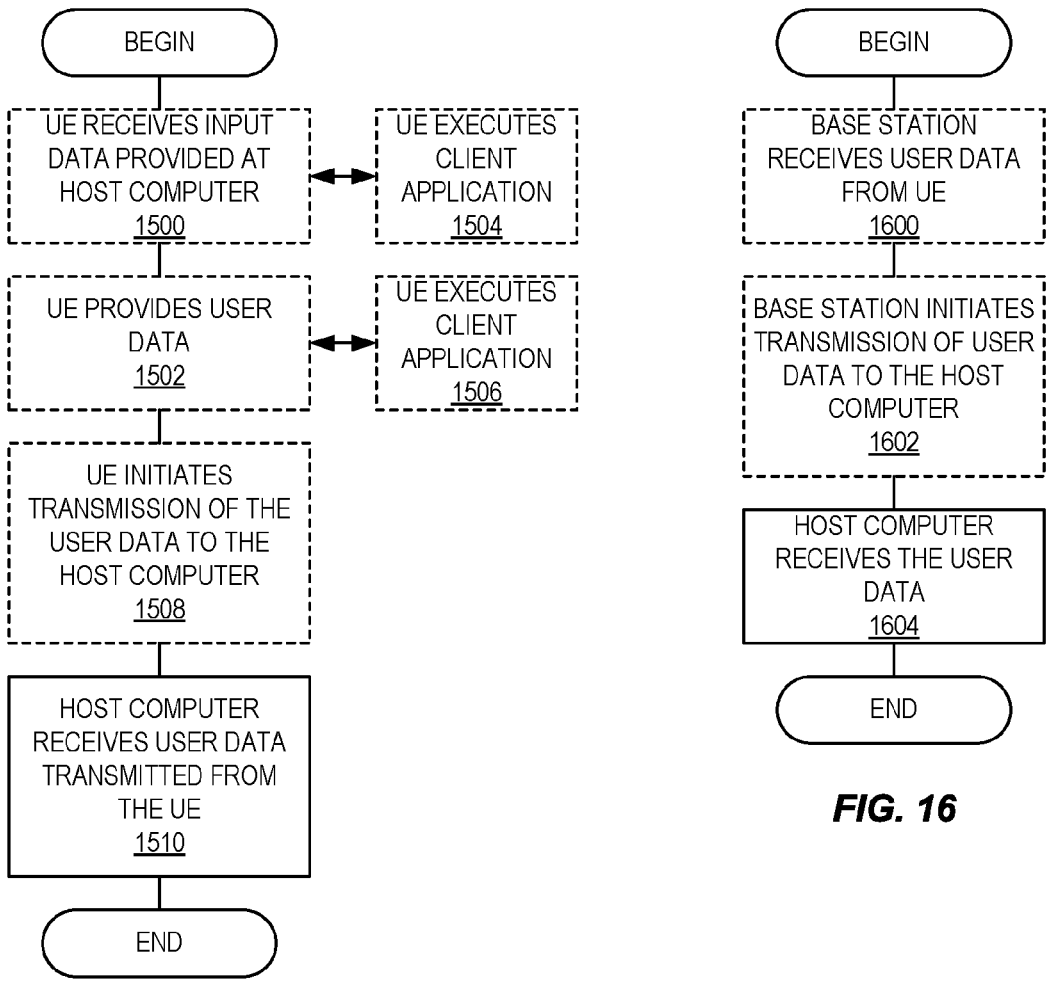
FIG. 15 is a flowchart illustrating a method implemented in a communication system in accordance with one embodiment of the present disclosure.
FIG. 16 is a flowchart illustrating a method implemented in a communication system in accordance with one embodiment of the present disclosure

FIG. 15 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 15 will be included in this section. In step 1500 (which may be optional), the UE receives input data provided by the host computer. Additionally or alternatively, in step 1502, the UE provides user data. In sub-step 1504 (which may be optional) of step 1500, the UE provides the user data by executing a client application. In sub-step 1506 (which may be optional) of step 1502, the UE executes a client application which provides the user data in reaction to the received input data provided by the host computer. In providing the user data, the executed client application may further consider user input received from the user. Regardless of the specific manner in which the user data was provided, the UE initiates, in sub-step 1508 (which may be optional), transmission of the user data to the host computer. In step 1510 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 16 will be included in this section. In step 1600 (which may be optional), in accordance with the teachings of the embodiments described throughout this disclosure, the base station receives user data from the UE. In step 1602 (which may be optional), the base station initiates transmission of the received user data to the host computer. In step 1604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Group A Embodiments

Embodiment 1: A method performed by a wireless device for transmitting feedback, the method comprising one or more of: being configured (400) with at least one feedback enabled Hybrid Automatic Repeat Request, HARQ, process while the remaining HARQ processes of the wireless device have feedback disabled; receiving (402) an activation/deactivation command requiring feedback, where the receiving uses the at least one feedback enabled HARQ process; and transmitting (404) feedback regarding the activation/deactivation command.

Embodiment 2: The method of embodiment 1 wherein the wireless device is configured by a network node.

Embodiment 3: The method of any of embodiments 1 to 2 wherein receiving the activation/deactivation command comprises receiving, from the network node, a first Physical Downlink Shared Channel, PDSCH, carrying a Medium Access Control, MAC, Control Element, CE, activation/deactivation command requiring a HARQ ACK/NACK feedback on Physical Uplink Control Channel, PUCCH, using the at least one feedback enabled HARQ process.

Embodiment 4: The method of any of embodiments 1 to 3 wherein transmitting the feedback comprises transmitting HARQ ACK/NACK feedback on PUCCH in slot n corresponding to the first PDSCH on PUCCH.

Embodiment 5: The method of any of embodiments 1 to 4 wherein the wireless device assumes that information related to the MAC CE activation/deactivation command is applied at the wireless device from a first slot after slot $n+X*N_{slot}^{subframe,\mu}$.

Embodiment 6: The method of embodiment 5 wherein the value of X will be indicated as part of wireless device specific Radio Resource Control, RRC, configuration.

Embodiment 7: The method of embodiment 5 wherein the value of X will be indicated as part of the system information (e.g., a System Information Block, SIB).

Embodiment 8: The method of any of embodiments 1 to 7 further comprising one or more of: receiving (406) a second activation/deactivation command requiring feedback, where the receiving uses one of the feedback disabled HARQ processes; and not applying (408) the information in the second activation/deactivation command.

Embodiment 9: The method of embodiment 8 wherein not applying the information comprises ignoring the second activation/deactivation command.

Embodiment 10: The method of any of embodiments 1 to 9 wherein the activation/deactivation command comprises an activation/deactivation MAC CE for PDSCH giving mapping of one or more Transmission Configuration Indicator, TCI, States to the codepoints of the TCI field of the Downlink Control Indicator, DCI.

Embodiment 11: The method of any of embodiments 1 to 9 wherein the activation/deactivation command comprises an activation/deactivation MAC CE for an sCell.

Embodiment 12: The method of any of embodiments 1 to 9 wherein the activation/deactivation command comprises an activation/deactivation MAC CE for spatial relation update of PUCCH Embodiment 13: The method of any of embodiments 1 to 9 wherein the activation/deactivation command comprises an activation/deactivation MAC CE for providing TCI state information for a Control Resource Set, CORESET.

Embodiment 14: The method of any of embodiments 1 to 9 wherein the activation/deactivation command comprises an activation/deactivation MAC CE or semi-persistent Zero-Power Channel State Information, ZP CSI-RS.

Embodiment 15: The method of any of embodiments 1 to 9 wherein the activation/deactivation command comprises an activation/deactivation MAC CE for semi-persistent CSI resource settings.

Embodiment 16: The method of any of embodiments 1 to 9 wherein the activation/deactivation command comprises an activation/deactivation MAC CE for semi-persistent CSI report settings.

Embodiment 17: The method of any of embodiments 1 to 9 wherein the activation/deactivation command comprises an activation/deactivation MAC CE for semi-persistent SRS.

Embodiment 18: The method of any of the previous embodiments, further comprising: providing user data; and forwarding the user data to a host computer via the transmission to the base station.

Group B Embodiments

Embodiment 19: A method performed by a base station for receiving feedback, the method comprising one or more of: transmitting (502), to a wireless device, an activation/deactivation command requiring feedback, where the transmitting uses at least one feedback enabled HARQ process of the wireless device while the remaining HARQ processes of the wireless device have feedback disabled; and receiving (504), from the wireless device, feedback regarding the activation/deactivation command.

Embodiment 20: The method of embodiment 19 further comprising: prior to transmitting the activation/deactivation command, configuring (500) the wireless device with at least one feedback enabled Hybrid Automatic Repeat Request, HARQ, process while the remaining HARQ processes of the wireless device have feedback disabled.

Embodiment 21: The method of any of embodiments 19 to 20 wherein transmitting the activation/deactivation command comprises transmitting, to the wireless device, a first Physical Downlink Shared Channel, PDSCH, carrying a Medium Access Control, MAC, Control Element, CE, activation/deactivation command requiring a HARQ ACK/NACK feedback on Physical Uplink Control Channel, PUCCH, using the at least one feedback enabled HARQ process.

Embodiment 22: The method of any of embodiments 19 to 21 wherein receiving the feedback comprises receiving HARQ ACK/NACK feedback on PUCCH in slot n corresponding to the first PDSCH on PUCCH.

Embodiment 23: The method of any of embodiments 19 to 22 wherein the base station assumes that information related to the MAC CE activation/deactivation command is applied at the wireless device from a first slot after slot $n+X*N_{slot}^{subframe,\mu}$.

Embodiment 24: The method of embodiment 23 wherein the value of X will be indicated as part of wireless device specific Radio Resource Control, RRC, configuration.

Embodiment 25: The method of embodiment 23 wherein the value of X will be indicated as part of the system information (e.g., a System Information Block, SIB).

Embodiment 26: The method of any of embodiments 19 to 25 further comprising one or more of: transmitting (506), to the wireless device, a second activation/deactivation command requiring feedback using one of the feedback disabled HARQ processes; and determining (508) that the wireless device does not apply the information in the second activation/deactivation command.

Embodiment 27: The method of embodiment 26 wherein not applying the information comprises the wireless device ignoring the second activation/deactivation command.

Embodiment 28: The method of any of embodiments 19 to 27 wherein the activation/deactivation command comprises an activation/deactivation MAC CE for PDSCH giving mapping of one or more Transmission Configuration Indicator, TCI, States to the codepoints of the TCI field of the Downlink Control Indicator, DCI.

Embodiment 29: The method of any of embodiments 19 to 27 wherein the activation/deactivation command comprises an activation/deactivation MAC CE for an sCell.

Embodiment 30: The method of any of embodiments 19 to 27 wherein the activation/deactivation command comprises an activation/deactivation MAC CE for spatial relation update of PUCCH.

Embodiment 31: The method of any of embodiments 19 to 27 wherein the activation/deactivation command comprises an activation/deactivation MAC CE for providing TCI state information for a Control Resource Set, CORESET.

Embodiment 32: The method of any of embodiments 19 to 27 wherein the activation/deactivation command comprises an activation/deactivation MAC CE or semi-persistent Zero-Power Channel State Information, ZP CSI-RS.

Embodiment 33: The method of any of embodiments 19 to 27 wherein the activation/deactivation command comprises an activation/deactivation MAC CE for semi-persistent CSI resource settings.

Embodiment 34: The method of any of embodiments 19 to 27 wherein the activation/deactivation command comprises an activation/deactivation MAC CE for semi-persistent CSI report settings.

Embodiment 35: The method of any of embodiments 19 to 27 wherein the activation/deactivation command comprises an activation/deactivation MAC CE for semi-persistent SRS.

Embodiment 36: The method of any of the previous embodiments, further comprising: obtaining user data; and forwarding the user data to a host computer or a wireless device.

Group C Embodiments

Embodiment 37: A wireless device for transmitting feedback, the wireless device comprising: processing circuitry configured to perform any of the steps of any of the Group A embodiments; and power supply circuitry configured to supply power to the wireless device.

Embodiment 38: A base station for receiving feedback, the base station comprising: processing circuitry configured to perform any of the steps of any of the Group B embodiments; and power supply circuitry configured to supply power to the base station.

Embodiment 39: A User Equipment, UE, for transmitting feedback, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 40: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 41: The communication system of the previous embodiment further including the base station.

Embodiment 42: The communication system of the previous 2 embodiments, further including the UE, wherein the UE is configured to communicate with the base station.

Embodiment 43: The communication system of the previous 3 embodiments, wherein: the processing circuitry of the host computer is configured to execute a host application, thereby providing the user data; and the UE comprises processing circuitry configured to execute a client application associated with the host application.

Embodiment 44: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 45: The method of the previous embodiment, further comprising, at the base station, transmitting the user data.

Embodiment 46: The method of the previous 2 embodiments, wherein the user data is provided at the host computer by executing a host application, the method further comprising, at the UE, executing a client application associated with the host application.

Embodiment 47: A User Equipment, UE, configured to communicate with a base station, the UE comprising a radio interface and processing circuitry configured to perform the method of the previous 3 embodiments.

Embodiment 48: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 49: The communication system of the previous embodiment, wherein the cellular network further includes a base station configured to communicate with the UE.

Embodiment 50: The communication system of the previous 2 embodiments, wherein: the processing circuitry of the host computer is configured to execute a host application, thereby providing the user data; and the UE's processing circuitry is configured to execute a client application associated with the host application.

Embodiment 51: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 52: The method of the previous embodiment, further comprising at the UE, receiving the user data from the base station.

Embodiment 53: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 54: The communication system of the previous embodiment, further including the UE.

Embodiment 55: The communication system of the previous 2 embodiments, further including the base station, wherein the base station comprises a radio interface configured to communicate with the UE and a communication interface configured to forward to the host computer the user data carried by a transmission from the UE to the base station.

Embodiment 56: The communication system of the previous 3 embodiments, wherein: the processing circuitry of the host computer is configured to execute a host application; and the UE's processing circuitry is configured to execute a client application associated with the host application, thereby providing the user data.

Embodiment 57: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 58: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 59: The method of the previous embodiment, further comprising, at the UE, providing the user data to the base station.

Embodiment 60: The method of the previous 2 embodiments, further comprising: at the UE, executing a client application, thereby providing the user data to be transmitted; and at the host computer, executing a host application associated with the client application.

Embodiment 61: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 62: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 63: The communication system of the previous embodiment further including the base station.

Embodiment 64: The communication system of the previous 2 embodiments, further including the UE, wherein the UE is configured to communicate with the base station.

Embodiment 65: The communication system of the previous 3 embodiments, wherein: the processing circuitry of the host computer is configured to execute a host application; and the UE is configured to execute a client application associated with the host application, thereby providing the user data to be received by the host computer.

Embodiment 66: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 67: The method of the previous embodiment, further comprising at the base station, receiving the user data from the UE.

Embodiment 68: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ACK Acknowledgement
ACK/NACK Acknowledgement/Negative Acknowledgement
AF Application Function
AMF Access and Mobility Function
AN Access Network
AP Access Point
AUSF Authentication Server Function
CE Control Element
CORESET Control Resource Set
CPU Central Processing Unit
CSI Channel State Information
CSI-RS Channel State Information Reference Signal
DCI Downlink Control Information
DL Downlink
DN Data Network
DSP Digital Signal Processor
eMBB Enhanced Mobile Broadband
eNB Enhanced or Evolved Node B
GEO Geostationary Earth Orbit
gNB New Radio Base Station
HARQ Hybrid Automatic Repeat Request
HSS Home Subscriber Server
IoT Internet of Things
IP Internet Protocol
ITS In-the-Sky
LEO Low Earth Orbit
LTE Long Term Evolution
MAC Medium Access Control
MEO Medium Earth Orbit
MME Mobility Management Entity
MTC Machine Type Communication
NACK Negative Acknowledgement
NEF Network Exposure Function
NF Network Function
NR New Radio
NRF Network Function Repository Function
NSSF Network Slice Selection Function
NTN Non-Terrestrial Network
OTT Over-the-Top
PC Personal Computer
PCF Policy Control Function
PDSCH Physical Downlink Shared Channel
PDCCH Physical Downlink Control Channel
P-GW Packet Data Network Gateway PHY Physical Layer
PUCCH Physical Uplink Control Channel
RAM Random Access Memory
RAN Radio Access Network
ROM Read Only Memory
RRC Radio Resource Control
RRH Remote Radio Head
RTT Round Trip Time
SAW Stop-and-Wait
SCEF Service Capability Exposure Function
sCell Secondary Cell
SCS Subcarrier Spacing
SIB System Information Block
SMF Session Management Function
TBS Transport Block Size
TCI Transmission Configuration Indicator
UDM Unified Data Management
UE User Equipment
UL Uplink
UPF User Plane Function
URLLC Ultra Reliable and Low Latency Communication
ZP Zero Power Those skilled in the art will recognize improvements and modifications to the embodiments of the present disclosure. All such improvements and modifications are considered within the scope of the concepts disclosed herein.

What is claimed is:

1. A method performed by a wireless device for transmitting feedback, the method comprising one or more of:
being configured by a network node with at least one feedback enabled Hybrid Automatic Repeat Request, HARQ, process while remaining HARQ processes of the wireless device have the feedback disabled;
receiving an indication of a number of slots, X, as part of a System Information Block, SIB, wherein X is specific to a delay associated with HARQ Acknowledgement/Negative Acknowledgement, ACK/NACK, feedback;
receiving, from the network node, a first Physical Downlink Shared Channel, PDSCH, carrying a Medium Access Control, MAC, Control Element, CE, activation/deactivation command requiring a HARQ ACK/NACK feedback on a Physical Uplink Control Channel, PUCCH, using the at least one feedback enabled HARQ process;
transmitting the HARQ ACK/NACK feedback on the PUCCH in a slot n corresponding to the first PDSCH on the PUCCH;
determining a delay term via multiplying X by a number of slots per subframe for a subcarrier spacing, SCS, μ associated with the PUCCH; and
assuming that an information in the MAC CE activation/deactivation command is applied at the wireless device from a slot n' where the slot n' is after a delay given by the determined delay term from the slot n.

2. The method of claim 1 wherein the value of X is indicated as part of a Radio Resource Control, RRC, configuration.

3. The method of claim 1 further comprising one or more of:
receiving a second activation/deactivation command requiring feedback, where the receiving uses one of the feedback disabled HARQ processes; and
not applying information in the second activation/deactivation command.

4. The method of claim 3 wherein not applying the information in the second activation/deactivation command comprises ignoring the second activation/deactivation command.

5. The method of claim 1 wherein the activation/deactivation command comprises an activation/deactivation MAC CE for the first PDSCH giving mapping of one or more Transmission Configuration Indicator, TCI, States to codepoints of a TCI field of a Downlink Control Indicator, DCI.

6. The method of claim 1 wherein the activation/deactivation command comprises an activation/deactivation MAC CE for an sCell.

7. The method of claim 1 wherein the activation/deactivation command comprises an activation/deactivation MAC CE for a spatial relation update of the PUCCH.

8. The method of claim 1 wherein the activation/deactivation command comprises an activation/deactivation MAC CE for providing Transmission Configuration Indicator, TCI, state information for a Control Resource Set, CORESET.

9. The method of claim 1 wherein the activation/deactivation command comprises an activation/deactivation MAC CE for a semi-persistent Zero-Power Channel State Information Reference Signal, ZP CSI-RS.

10. The method of claim 1 wherein the activation/deactivation command comprises an activation/deactivation MAC CE for semi-persistent Channel State Information, CSI, resource settings.

11. The method of claim 1 wherein the activation/deactivation command comprises an activation/deactivation MAC CE for semi-persistent CSI report settings.

12. The method of claim 1 wherein the activation/deactivation command comprises an activation/deactivation MAC CE for a semi-persistent Sounding Reference Signal, SRS.

* * * * *